United States Patent [19]

Noble

[11] Patent Number: 5,647,643

[45] Date of Patent: Jul. 15, 1997

[54] WHEEL HUB

[76] Inventor: Ryun Bates Noble, 4045 N. Imperial Way, Provo, Utah 84604

[21] Appl. No.: 397,413

[22] Filed: Mar. 1, 1995

[51] Int. Cl.$^6$ .................................................. B60B 21/06
[52] U.S. Cl. .......................................... 301/110.5; 301/59
[58] Field of Search .......................... 301/55, 59, 110.5, 301/110.6, 105.1, 124.2

[56] References Cited

U.S. PATENT DOCUMENTS

| | | | |
|---|---|---|---|
| 4,424,981 | 1/1984 | Maxwell, III | 301/110.5 X |
| 5,106,210 | 4/1992 | Chi | 384/498 |
| 5,163,740 | 11/1992 | Kawai et al. | 301/110.5 |
| 5,292,287 | 3/1994 | Hsieh | 474/151 |
| 5,324,100 | 6/1994 | James | 301/110.5 |
| 5,332,295 | 7/1994 | Vogel et al. | 301/110.5 |
| 5,383,729 | 1/1995 | Hsieh | 384/545 |

FOREIGN PATENT DOCUMENTS

| | | | |
|---|---|---|---|
| 3018049 | 11/1981 | Germany | 301/110.5 |
| 3612772 | 10/1987 | Germany | 301/110.5 |
| 1691141 | 11/1991 | U.S.S.R. | 301/105.1 |

OTHER PUBLICATIONS

"Mountain Bike Action", *The New Round of Hubs, The little things that you can't do with out*, pp. 165–169 (Jun. 1, 1995).

"Mountain Bike Action", *Quick Releases, Rhino Racing Cranks*, p. 152 (Jan. 1995).

*Primary Examiner*—Russell D. Stormer
*Attorney, Agent, or Firm*—Madson & Metcalf

[57] ABSTRACT

A wheel hub for attachment to a wheel rim which includes a hollow axle and a pair of annular bearing assemblies is disclosed. The bearing assemblies have inner and outer annular parts, inner and outer circumferential surfaces, and inner and outer side surfaces. The inner side surface of the inner annular part of each annular bearing assembly engages the ends of the axle in end-to-side abutment. The wheel hub also includes a pair of stops having a wedge end and an axle end. The axle end of each stop may be disposed through one of the bearing assemblies and into one of the ends of the hollow axle capturing a respective annular bearing assembly between the wedge end of the stop and the end of the axle. An annular abutment bracket is press fit over each bearing assembly. Each annular abutment bracket facilitates attachment of the wheel hub to a wheel rim. Each annular abutment bracket also has a lip which engages the outer side surface of the outer annular part of the bearing assembly to which it is attached and prevents the annular abutment bracket from slipping off the bearing assembly under the inward force exerted when the wheel hub is attached to a wheel rim.

26 Claims, 8 Drawing Sheets

WHEEL HUB

BACKGROUND

1. The Field of the Invention

The present invention is related to wheel hubs. More particularly, the present invention is related to a lightweight wheel hub which includes annular bearing assemblies which engage the ends of a substantially hollow axle. The wheel hub also has a pair of stops positioned within the axle of the wheel to provide a means of attachment to a bike frame and to offer stability.

2. Technical Background

An important consideration for users and manufacturers of high-end performance bicycles is the weight of the bicycle. A lighter bike reacts faster to rider input and it takes less of the rider's energy to power a lighter bicycle. Simply stated, the lighter the bicycle weighs, the easier it is to maneuver and the better the performance that can be obtained from the bicycle. Thus, manufacturers of cutting edge performance bicycles are continuously upgrading their bicycles to decrease weight.

One obvious way to reduce the weight of a bicycle is to use bicycle parts made of lighter materials. Another way to reduce the weight of a bicycle is to simplify the design of bicycle part so that it can be manufactured using less material. This can be done by economizing or combining the function of multiple pieces such that one piece can perform the function of what was formerly required of two or more pieces.

An area of the bicycle where the function of separate parts could be combined, thereby reducing the amount of material needed, is in the wheel hub. Many wheel hubs comprise a hollow axle with a pair of annular bearing assemblies positioned concentrically over the axle and a hollow cylindrical shell. The bearing assemblies are prevented from inward movement along the axle by the hollow cylindrical shell enclosed about the axle which acts as a spacer between the bearing assemblies. Each end of the shell engages a respective bearing assembly to maintain the bearing assembly in a spaced relationship.

In other wheel hub designs, a hollow shell with raised ends is positioned over the axle between the bearing assemblies. The raised ends provide a way to attach the hub to a wheel rim using spokes or other means.

Still other designs use the axle to separate the annular bearing assemblies and utilize attachment rings to provide a way to attach the hub to a wheel rim. However, the attachment rings of these designs are designed such that a hollow shell positioned over the axle is needed to prevent the attachment rings from slipping off of the bearing assemblies in an inward direction.

Users, and thus manufacturers of performance bicycles, demand optimal responsiveness from their bicycles when riding. The more a wheel hub flexes, the less responsive it will be. Flexibility of a wheel hub is due in part to the diameter of the wheel hub axle. An axle having a smaller diameter will flex more than an axle having a greater diameter. Many wheel hubs are designed with an axle having a diameter of between 8 and 9 millimeters.

From the foregoing, it will be appreciated that it would be an advancement in the art to provide a wheel hub where the bearing assemblies were separated and held in a spaced relationship by the axle.

It would be a further advancement in the art if the wheel hub could be attached to a wheel rim without the need for an exterior shell.

It would be an additional advancement in the art if annular brackets configured with means to prevent sliding off the bearing assemblies were used to attach the wheel hub to a wheel rim.

It would be still another advancement in the art if the bicycle hub were designed to permit axles having a greater diameter.

Such a wheel hub is disclosed and claimed herein.

BRIEF SUMMARY OF THE INVENTION

The present invention is directed to a novel wheel hub. In one embodiment, the wheel hub has a substantially hollow axle and a pair of annular bearing assemblies. The bearing assemblies have an inner and outer annular part. The inner annular part has an inner circumferential surface and the outer annular part has an outer circumferential surface. Each of the inner and outer annular parts of a bearing assembly has an inner and outer side surface. In a currently preferred embodiment, the inner side surface of inner annular part of one annular bearing assembly engages one end of the axle and the inner side surface of the inner annular part of the other annular bearing assembly engages the other end of the axle in end-to-side abutment. The outer annular part is independently rotatable with respect to the inner annular part. The inner diameter of each annular bearing assembly is substantially equal to the inner diameter of the hollow ends of the axle.

The wheel hub is also configured with a pair of stops. In a preferred embodiment, each stop has an axle end and a wedge end. The axle end fits snugly through one of the annular bearing assemblies and within the substantially hollow axle until the wedge end of the stop engages the outer side surface of the annular bearing assembly aligning and capturing that annular bearing assembly between the end of the axle and the stop. The axle end of the stops is also configured to maintain the inner diameter of each annular bearing assembly and the inner diameter of each end of the axle in axial alignment, thus limiting the lateral movement of the annular bearing assemblies with respect to the ends of the axle that each annular bearing assembly engages.

In one embodiment, the wheel hub has a pair of annular abutment brackets. Each annular abutment bracket is press fit over the outer circumferential surface of the outer annular part of one of the annular bearing assemblies. The abutment bracket attached to each outer annular part rotates independently of each other.

Each annular abutment bracket has a flange which extends away from the axle. The flange preferably includes means for attaching the flange to a wheel rim, such as to receive conventional wheel spoke. Each annular abutment bracket also has a lip which engages the outer side surface of a respective annular bearing assembly. This prevents the annular abutment bracket from slipping off the annular bearing assembly when subjected to an inward force.

An inward force typically occurs when the wheel hub is attached to a wheel rim. The attachment of the wheel hub to the wheel rim, for example, by spokes secured between the wheel hub and the wheel rim, creates a force with an inward component on each annular abutment bracket. The lip of the annular abutment bracket pushes against the outer side surface of the annular bearing assembly to which it is fitted. Because the axle is engaged with the end of the axle in end-to-side abutment and not positioned concentrically over the axle, the position of the annular bearing assembly is maintained. Thus, there is no need for an external shell and the wheel hub disclosed herein can be manufactured much lighter than conventional hubs.

The wheel hub can be combined with a wheel rim by inserting spokes into the holes of the abutment bracket flange and attaching the spokes to the inner surface of a wheel rim. The wheel can be secured to a bicycle frame by means of a conventional skewer disposed within the substantially hollow axle. The skewer has a cap at one end and is threaded at the other end to receive a threaded cap. By tightening the threaded cap on the threaded end of the skewer, a bicycle frame can be clamped between the cap and the wedge end of the first stop and between the threaded cap and the wedge end of the second stop.

These and other advantages of the present invention will become more fully apparent by examination of the following description of the preferred embodiments and the accompanying drawings.

BRIEF DESCRIPTION OF THE DRAWINGS

To better understand the invention, a more particular description of the invention will be rendered by reference to the appended drawings. These drawings provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

Figure 1:
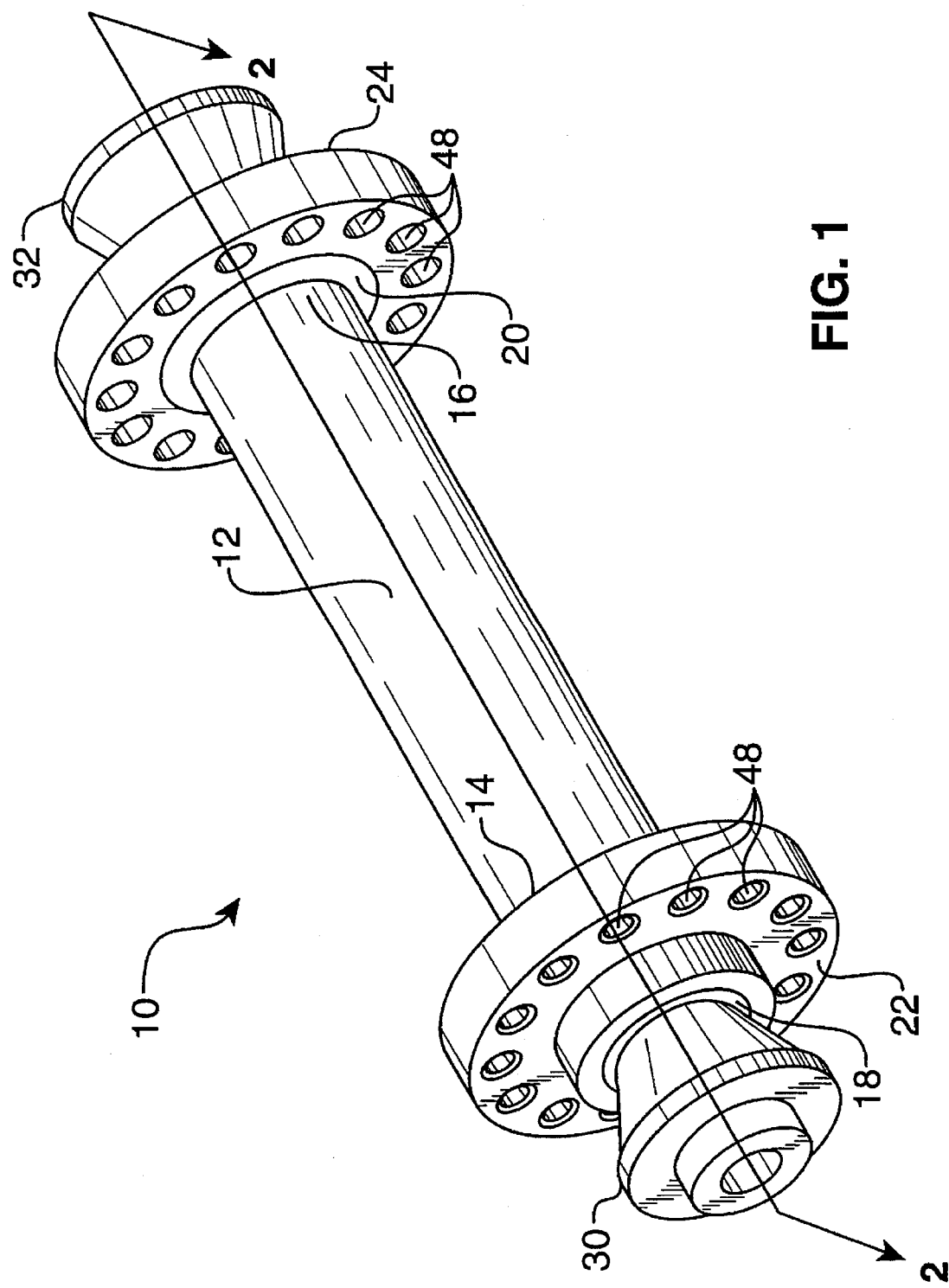
FIG. 1 is a perspective view of one wheel hub embodiment.

Reference is now made to the figures wherein like parts are referred to by like numerals throughout. With particular reference to FIG. 1, a wheel hub according to the present invention is generally designated at 10.

The wheel hub 10 includes a means for spacing bearing assemblies which in the preferred embodiment is an axle 12 having a first end 14 and a second end 16. In a presently preferred embodiment, the axle 12 is hollow, although it will be appreciated that the teachings of this invention could be practiced with an axle 12 that is not entirely hollow. The diameter of the axle 12 preferably is between 7 and 25 millimeters. The diameter of the axle 12 of the preferred embodiment of FIG. 1 is about 16 millimeters. The axle 12 can be made of various types of materials including titanium, aluminum and other metals, alloys, or composite materials which are strong yet lightweight. In the preferred embodiment of FIG. 1, the axle 12 is made of 7075 series aluminum known in the art.

Figure 2:
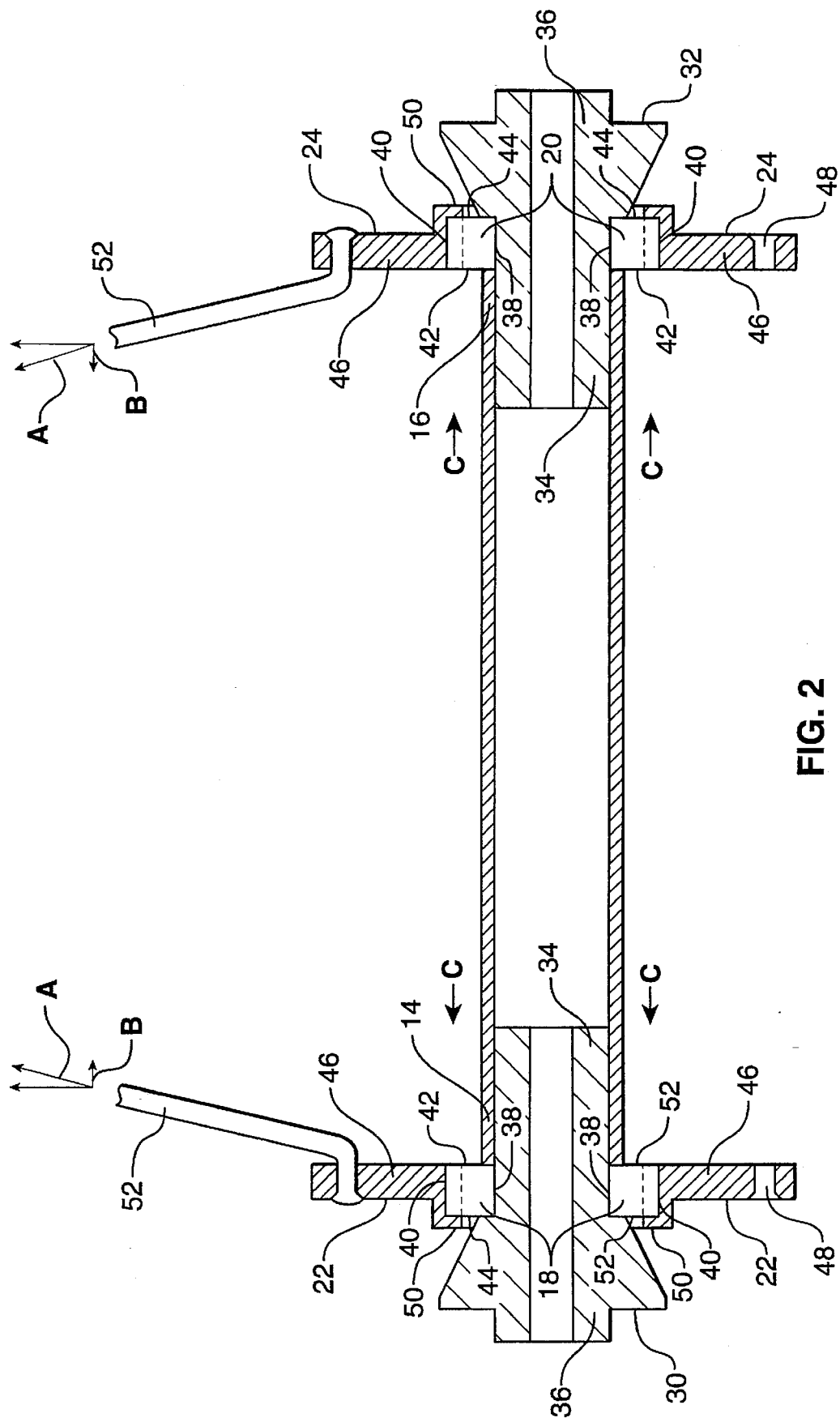
FIG. 2 is a cross-sectional view of the wheel hub taken along line 2—2 of FIG. 1 indicating force vectors exerted on the wheel hub by the means of attachment to a rim.
Figure 3A:
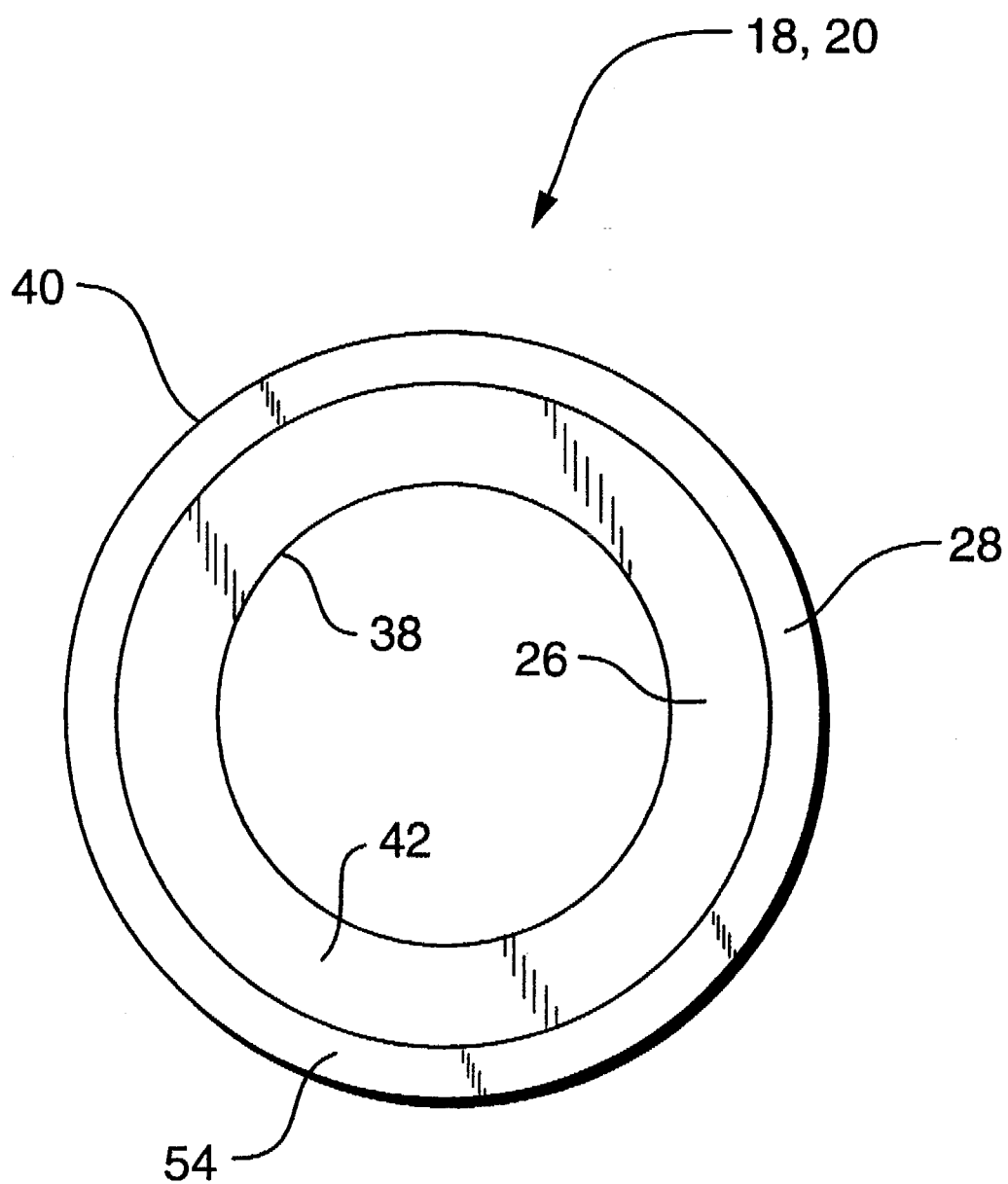
FIG. 3A is a front plan view of the annular bearing assembly of FIG. 1.
Figure 4:
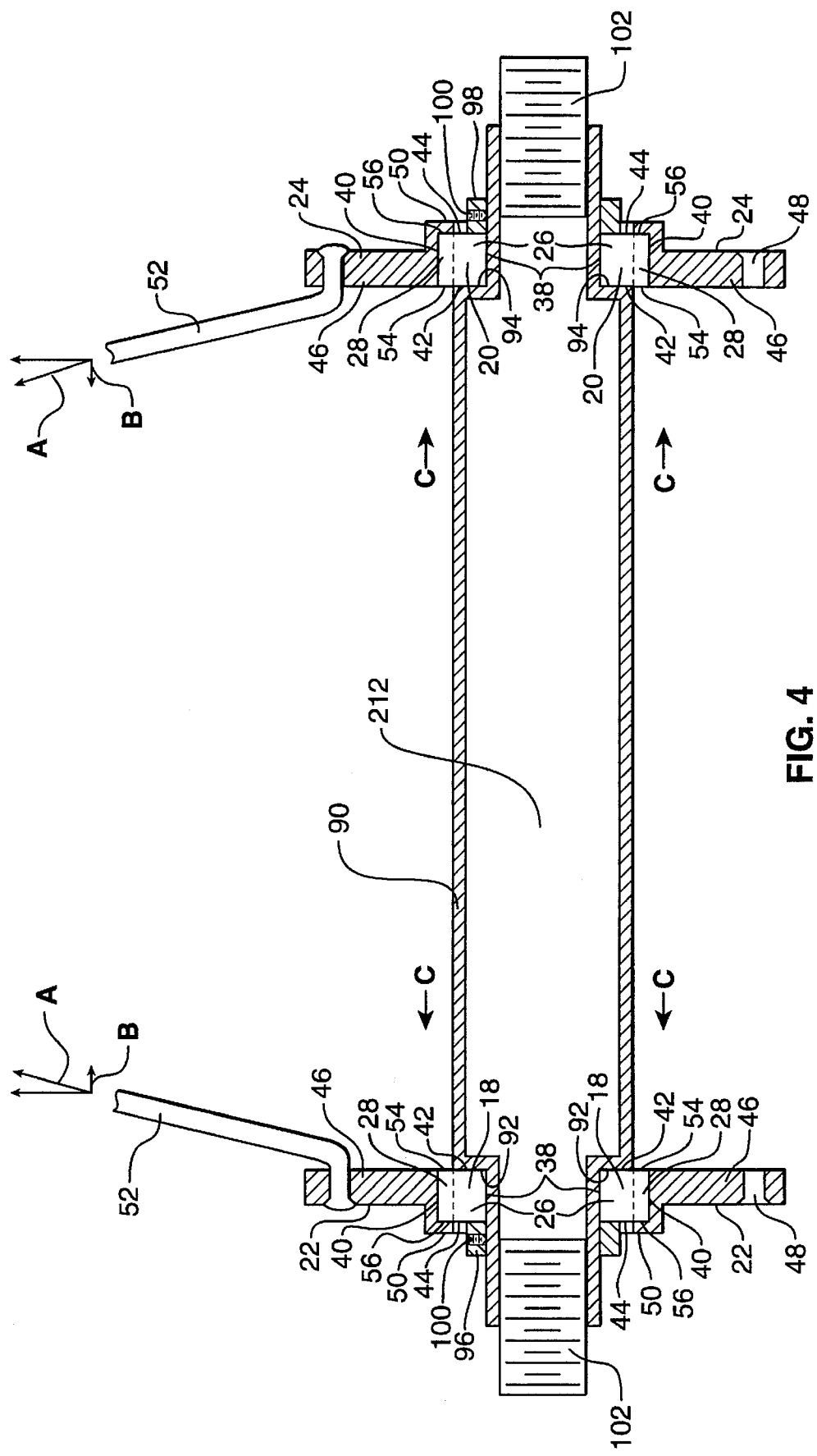
FIG. 4 is a cross-sectional view of another wheel hub showing an alternative embodiment of the axle and a pair of annular locking pieces.

FIGS. 1 and 2 show a first annular bearing assembly 18 and a second annular bearing assembly 20. With reference to FIG. 3A, each bearing assembly 18, 20 has an inner annular part 26 and an outer annular part 28. In the illustrated embodiment, the inner annular part 26 is capable of independent rotation with respect to the outer annular part 28. Each inner annular part 26 has an inner circumferential surface 38 and each outer annular part 28 has an outer circumferential surface 40. Each inner annular part 26 has an inner side surface 42 and an outer side surface 44 (FIG. 2). Each outer annular part 28 also has an inner side surface 54 and an outer side surface 56 (FIG. 4). Referring again to FIGS. 1 and 2, the circumferential surface 38 has a diameter substantially equal to the inside diameter of the hollow axle 12. In a preferred embodiment, the inner side surface 42 of the inner annular part 26 of the first annular bearing assembly 18 engages the first end 14 of the axle 12 in end-to-side abutment and the diameters of the inner circumferential surface 38 and the hollow axle 12 align. The inner side surface 42 of the inner annular part 26 of the second annular bearing assembly 20 engages the second end 16 of the axle 12 in end-to-side abutment and the diameters of the inner circumferential surface 38 and the hollow axle 12 align. The disposition of the axle 12 between the annular bearing assemblies 18, 20 maintains the annular bearing assemblies in a spaced relation to each other and obviates the need for a shell or other piece to perform the function of a spacer. This allows the presently preferred embodiment of the wheel hub 10 to be lighter.

The annular bearing assemblies 18, 20 may be one of a number of different varieties. The annular bearing assemblies 18, 20 of the preferred embodiment of FIG. 1 are precision sealed cartridge bearings such as those commercially available and used in the bicycle industry. Each annular bearing assembly 18, 20 is preferably able to withstand a side load of between 150 and 600 pounds per square inch and a radial load of between 300 and 900 pounds per square inch before the bearing assembly fails. The sealed cartridge bearings used in the preferred embodiment can each withstand a side load of about 350 pounds per square inch and a radial load of about 50 pounds per square inch.

With reference still to FIGS. 1 and 2, a first annular abutment bracket 22 and second annular abutment bracket 24 are shown. The first annular abutment bracket 22 is disposed over the outer circumferential surface 40 of the first annular bearing assembly 18. The second annular abutment bracket 24 is disposed over the outer circumferential surface 40 of the second annular bearing assembly 20. In a presently preferred embodiment, the annular abutment brackets 22, 24 are press fitted over the bearing assemblies 18, 20 for a tight friction fit. The attachment of the annular abutment brackets 22, 24 to the annular bearing assemblies 18, 20 is such that each annular abutment bracket 22, 24 can independently rotate with respect to the inner circumferential surface 38 of the respective annular bearing assembly 18, 20 to which each annular abutment bracket 22, 24 is attached.

It will be appreciated that a variety of methods could be used to dispose the annular abutment brackets 22, 24 over the annular bearing assemblies 18, 20 including physical force or pounding. Additionally, the annular abutment brackets 22, 24 can be attached to the annular bearing assemblies 18, 20 in a variety of ways and still allow the annular abutment brackets 22, 24 to rotate while the inner circumferential surfaces 38 remain fixed. These ways may include spot welding the annular abutment bracket to the annular bearing assembly or using a bonding solution to affix the annular abutment bracket to the bearing assembly.

The annular abutment brackets 22, 24 can be made of various types of materials including metals and metal alloys such as titanium and aluminum and alloys therefor; rubbers; composites; and plastics. In one embodiment, the annular abutment brackets 22, 24 are made of metal composites. In the preferred embodiment of FIG. 1, the annular abutment brackets 22, 24 are made of 7075 series aluminum.

With reference to FIGS. 1 and 2, the wheel hub 10 preferably includes a first stop 30 and second stop 32. Each stop 30, 32 is configured with an axle end 34 and a wedge end 36. The axle end 34 of each stop 30, 32 is configured to fit through one of the annular bearing assemblies 18, 20 and to fit snugly within a hollow portion of the axle 12, such that the wedge end 36 of the stop 30, 32 engages the outer side surface 44 of the annular bearing assembly 18, 20. The first stop 30 aligns and captures the first annular bearing assembly 18 between the wedge end 36 of first stop 30 and the first end 14 of the axle 12. The second stop 32 aligns and captures the second annular bearing assembly 20 between the wedge end 36 of second stop 32 and the second end 16 of the axle 14.

The axle end 34 of each stop 30, 32 has an outer diameter that is substantially equal to the inner diameter of the hollow of the axle 12 and the inner circumferential surface 38 of each annular bearing assembly 18, 20. This configuration maintains the alignment of the annular bearing assemblies 18, 20 with the axle 12 and limits the lateral movement of the annular bearing assemblies 18, 20 with respect to the end 14, 16 of the axle 12 when the axle end 34 is disposed through an annular bearing assembly 18, 20 and into the hollow of the axle 12.

It will be appreciated that the teachings of this invention can be practiced using a variety of stop shapes, so long as each annular bearing is captured between a stop 30, 32 and one end 14, 16 of the axle 12 and so long as the stop 30, 32 limits the lateral movement of the annular bearing assemblies 18, 20 with respect to the end 14, 16 of the axle 12.

Like the axle 12 and the annular abutment brackets 22, 24, the stops 30, 32 can be made from a variety of materials including metals, metal alloys, rubbers, composites, and plastics. In the preferred embodiment of FIG. 1, the stops 30, 32 are made of 7075 series aluminum.

The design of the wheel hub 10 allows the manufactured weight to be between 30 and 100 grams. In a preferred embodiment, the entire wheel hub weighs about 60 grams. The lack of necessity for any type of shell to separate the bearing assemblies 18, 20, or the abutment brackets 22, 24 allows the axle 12 to be at least partially visible and reduces the overall weight of the wheel hub 10 by about 40% over known wheel hubs.

FIGS. 1 and 2 show that each annular abutment bracket 22, 24 has a flange 46 which extends outwardly from the axle 12. Each annular abutment bracket 22, 24 has an attachment means to facilitate attachment of the wheel hub 10 to a rim. In the preferred embodiment shown, the attachment means comprises a plurality of holes 48 for receiving spokes 80. As best seen in FIG. 2, one end of each hole 48 is tapered. It will be appreciated that either or both ends of the holes may be tapered to facilitate attachment. Furthermore, the holes 48 need not be tapered at all to practice the teachings of this invention. Other openings may also be used including a large variety of grooves or slots configured to receive various means of attachment.

It will also be appreciated that a variety of flange shapes, sizes, and configurations could be used to facilitate attachment to a rim. The teachings of this invention may also be practiced if the annular abutment bracket allowed attachment to a rim by means of a bolt, rivet, or a variety binding type substances. The flanges 46 may alternatively be configured with of a series of one or more tabs to facilitate attachment to a rim. In a preferred embodiment, the flanges 46 are annular.

FIG. 2 illustrates a lip 50 of the annular abutment brackets 22, 24. The lip 50 of the first annular abutment bracket 22 engages the outer side surface 56 of the outer annular part 28 of the first annular bearing assembly 18. The lip 50 of the second annular abutment bracket 24 engages the outer side surface 56 of the outer annular part 28 of the second annular bearing assembly 20.

It will be appreciated that the lip 50 may also be configured to comprise one or more tabs, a scalloped configuration, or a variety of other configurations which would engage the outer side surface 56 of the outer annular part 28 of the annular bearing assemblies 18, 20. In the preferred embodiment of FIG. 2, the lip 50 is annular.

When the wheel hub 10 is attached to a wheel rim 58, the attachment means 52 subjects each annular abutment bracket 22, 24 to a force A having an inward component vector B. The lip 50 of each annular abutment bracket 22, 24 prevents each annular abutment bracket 22, 24 from inwardly disengaging the annular bearing assembly 18, 20 to which each annular abutment bracket 22, 24 is attached.

It will be appreciated that the abutment brackets 22, 24 can be configured in a variety of ways to enable them to not disengage the annular bearing assemblies 18, 20 under the inward component vector B of the force A created by the attachment means 52. These include, but are not limited to configuring the annular abutment bracket 22, 24 with a notch that fits within a corresponding groove in the outer surface 40 of the annular bearing assemblies 18, 20. The annular abutment brackets 22, 24 may also be permanently affixed to the bearing assemblies 18, 20.

The inward component vector B of the force A is transferred from each annular abutment bracket 22, 24 to the annular bearing assembly 18, 20 to which it is attached. The first end 14 of the axle 12 exerts a force C on the inner side surface 42 of the inner annular part 26 of the first annular bearing assembly 18 in the opposite direction as the inward component vector B of the force A exerted on the first annular bearing assembly 18. The second end 16 of the axle 12 exerts a force C on the inner side surface 42 of the inner annular part 26 of the second annular bearing assembly 20 in the opposite direction as the inward component vector B of the force A exerted on the second annular bearing assembly 20. It will be appreciated that the attachment means dictates the magnitude of the inward component vector B and force C.

Figure 3:
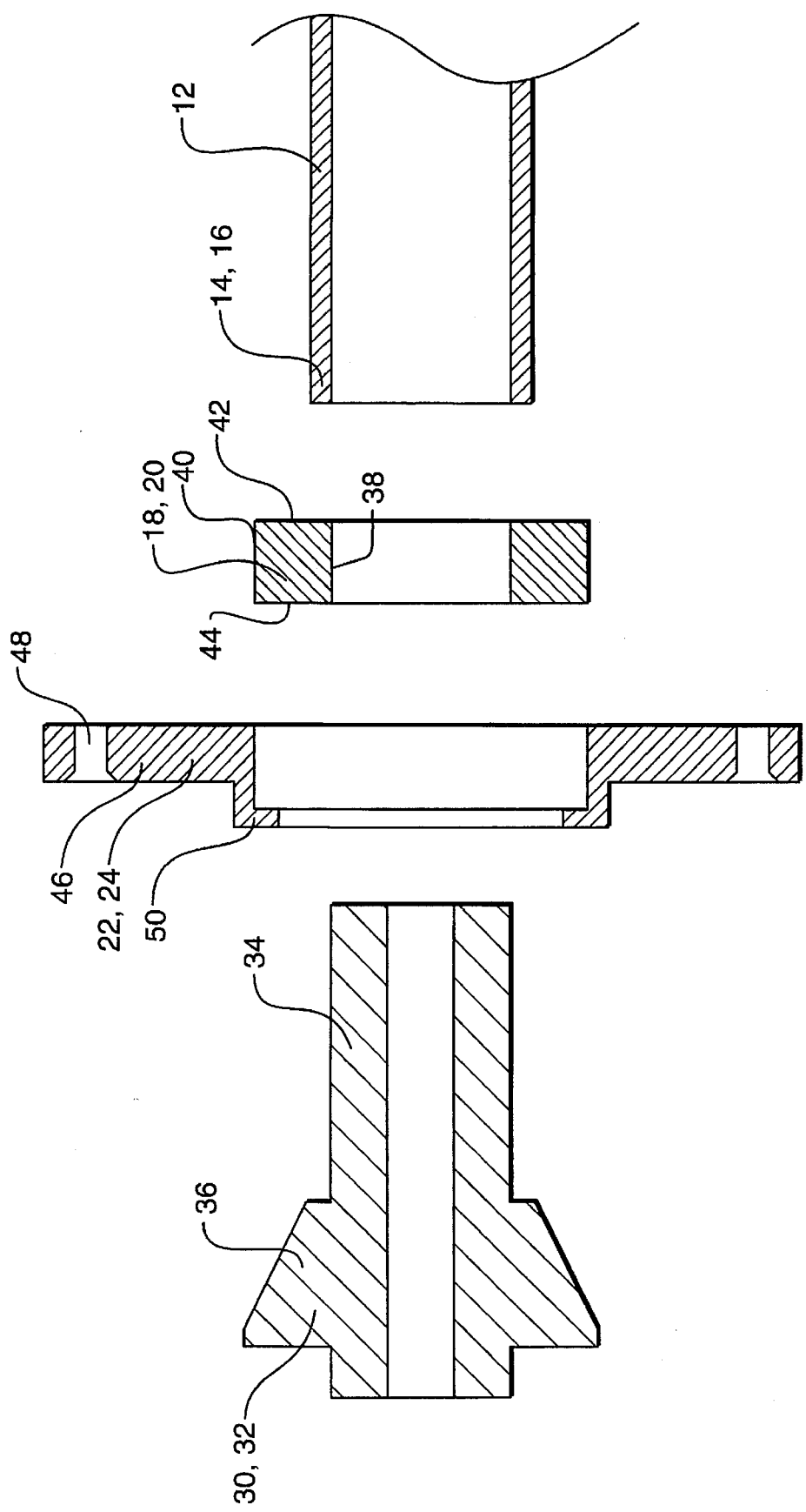
FIG. 3 is an enlarged exploded view of a portion of the wheel hub shown in FIG. 2.

With reference now to FIG. 3, an exploded wheel hub 10 is shown. The wheel hub 10 is assembled by press fitting each annular bearing assembly 18, 20 into a respective annular abutment bracket 22, 24 such that the lip 50 of each annular abutment bracket 22, 24 is disposed adjacent to or engages the outer side surface 56 of the outer annular part 28 of the annular bearing assembly 18, 20 over which it is disposed. Each annular bearing assembly 18, 20 is then positioned over the axle end 34 of one of the stops 30, 32 such that the outer side surface 44 of the inner annular part 26 of each annular bearing assembly 18, 20 engages the wedge end 36 of a respective stop 30, 32. Each stop 30, 32 is then inserted within the hollow of one end 14, 16 of the axle 12 until the inner side surface 42 of each annular bearing assembly 18, 20 engages a respective end 14, 16 of the axle 12. It will be appreciated that these steps may be performed in various orders, or simultaneously.

Referring now to FIG. 4, an alternative embodiment of the axle 212 is shown. The axle 212 has a raised section 90 with a first side surface 92 and a second side surface 94. Each annular bearing assembly 18, 20 is positioned over the axle 212 such that the first side surface 92 of the raised section 90 engages the inner side surface 42 of the inner annular part 26 of the first annular bearing assembly 18 and such that the second side surface 94 of the raised portion 90 of the axle 212 engages the inner side surface 42 of the inner annular part 26 of the second annular bearing assembly 20. This configuration prevents the inward movement of each annular bearing assembly 18, 20 along the axle 212. Thus, the bearing assemblies 18, 20 are maintained in a spaced relationship.

It will be appreciated that the raised surface need not be an integral part of the axle. For example, a raised surface in the form of a sheath slid over the axle could be used such that one end of the sheath would abut the inner side surface 42 of the inner annular part 26 of the first annular bearing assembly 18, and the other end of the sheath would abut the inner side surface 42 of the inner annular part 26 of the second annular bearing assembly 20.

The diameter of the axle 212 of the embodiment in FIG. 4, where it is positioned within each annular bearing assembly 18, 20, is substantially the same as the diameter of each annular bearing assembly 18, 20 thereby substantially aligning each annular bearing assembly 18, 20 with the axle 212.

With reference still to FIG. 4, a first annular locking piece 96 and a second annular locking piece 98 are releasably secured to the axle 212 by a holding screw 100. The first annular locking piece 96 abuts the outer side surface 44 of the inner annular part 26 of the first annular bearing assembly 18 and the second annular locking piece 98 abuts the outer side surface 44 of the inner annular part 26 of the second annular bearing assembly 20. This configuration captures each annular bearing assembly 18, 20 between an annular locking piece 96, 98 and a side surface 92, 94 of a raised section 90 of the axle 212.

It will be appreciated that a variety a locking configurations could be used to secure the annular bearing assemblies 18, 20 in place. These may include an annular ring permanently affixed to the axle 212, a cotter pin assembly, or a substantially c-shaped clip resting in a groove disposed within the axle 212. It will also be appreciated that a locking piece is not necessary to practice the teachings of this invention.

The embodiment of FIG. 4 also illustrates an alternative embodiment for means of attaching the hub to a bike frame. FIG. 4 illustrates a pair of threaded plugs 102 secured within a respective end of the axle 212. A bolt may be secured to a respective plug 102 to clamp the bike frame against the axle 12. The plug 102 could also be configured such that a bike frame could be clamped against the annular locking piece 96, 98. The plugs 102 may be secured to the axle 212 in a variety of ways. These may include press fitting plugs within the hollow axle 212, threading the inside of the axle 212 to receive the threaded plugs 102, driving one or more screws or bolts through the axle 212 into the plugs 102, using an epoxy or other bonding device to glue the plugs 102 into the end of the axle 212, or welding the plugs 102 in place. It will be appreciated that the teachings of this invention may be practiced using a plug 102 that is not threaded. This may be accomplished by using a clamp, or other device to maintain the bike frame in contact with the hub.

Figure 5:
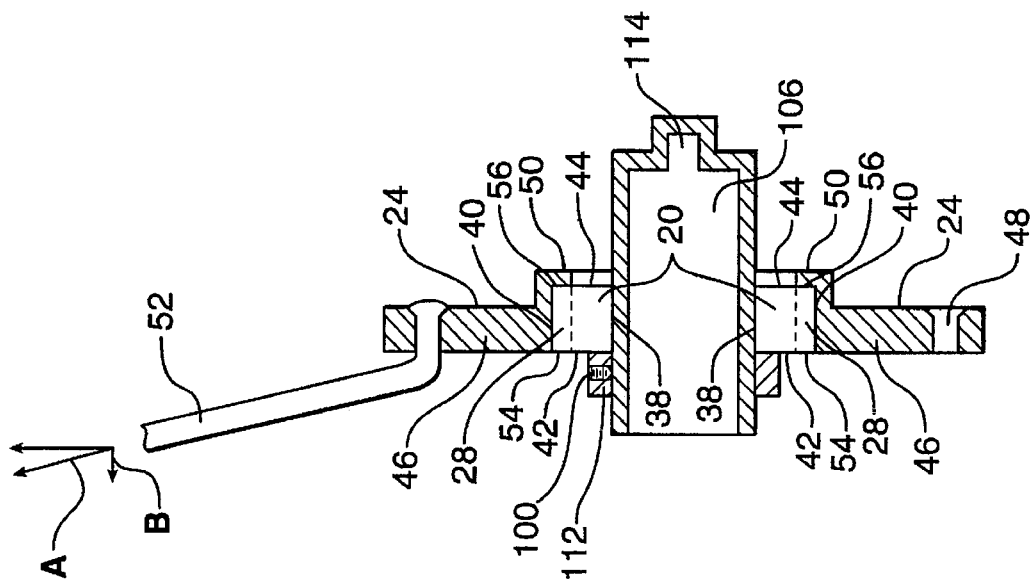
FIG. 5 is a cross-sectional view of the annular bearing assembly and annular abutment bracket showing an alternative embodiment of the axle and a pair of annular members.
Figure 5:
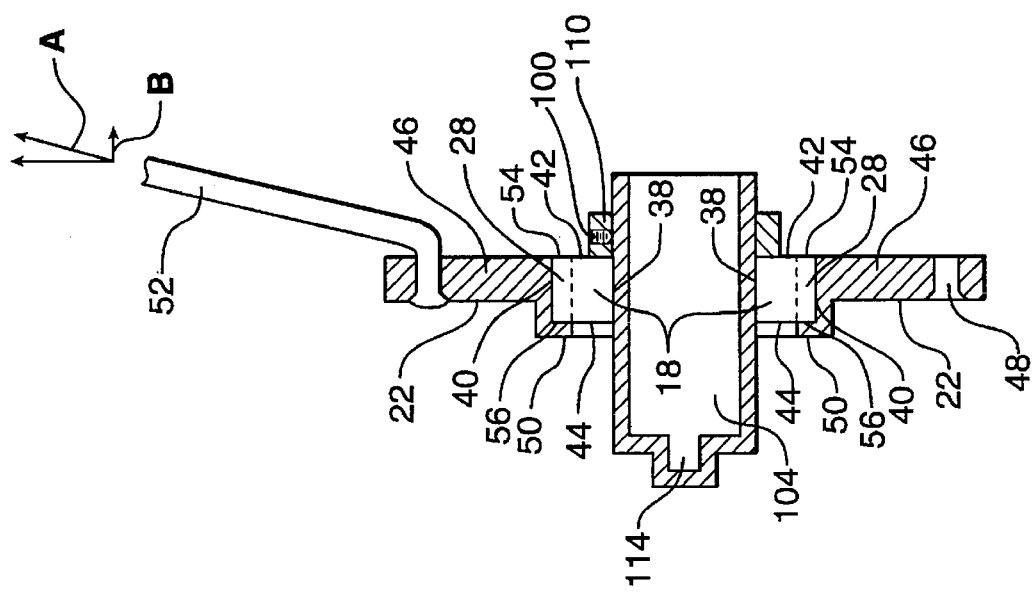

Referring now to FIG. 5, an alternative embodiment for securing the annular bearing assemblies in a spaced relationship is shown. FIG. 5 illustrates a first axle piece 104 and a second axle piece 106. In this embodiment, a bike frame, to which the axle pieces may be attached, maintains the axle pieces in a spaced relationship. FIG. 5 also illustrates an alternative means for maintaining the annular bearing assemblies 18, 20 is a spaced relationship. In this embodiment, a first annular member 110 is disposed about the first axle piece 104 such that when the first annular bearing assembly 18 is positioned over the first axle piece 104 and subjected to the inward force B provided by the attachment means 52, the first annular member 110 engages the inner side surface 42 of the inner annular part 26 of the first annular bearing assembly 18. The first annular member 110 is secured to the first axle piece 104 by means of a locking screw 100. A second annular member 112 is disposed about the axle 12 such that when the second annular bearing assembly 20 is positioned over the second axle piece 106 and subjected to the inward force B provided by the attachment means 52, the second annular member 112 engages the inner side surface 42 of the inner annular part 26 of the second annular bearing assembly 20. The second annular member 112 is secured to the second axle piece 106 by means of a locking screw 100. This configuration prevents the inward movement of each annular bearing assembly 18, 20 along the axle 12. It will be appreciated that these annular members 110, 112 may be used in conjunction with a whole axle 12. It will also be appreciated that the annular members 110, 112 may be configured in a variety of ways so long as the inward movement of the annular bearing assemblies is limited.

It will also be appreciated that the mechanism used to prevent the inward movement of the annular bearing assemblies 18, 20 illustrated in this embodiment or those used on an axle may vary. These mechanisms may include one or more screws inserted into the axle or axle pieces 104, 106 such that the screw head abuts the inner side surface 42 of the inner annular part 26 of each annular bearing assembly 18, 20. These mechanisms may also include securing one or more tabs to the axle or axle pieces 104, 106 such that the screw head abuts the inner side surface 42 of the inner annular part 26 of each annular bearing assembly 18, 20.

FIG. 5 also illustrates an alternative embodiment for attaching the hub to a bike frame. The axle pieces 104, 106 are configured with an extension 114. The extension in this embodiment can be utilized as a mount to which the bike frame could be bolted or welded. It will be appreciated that the extension could be threaded to receive a nut to facilitate attachment of the wheel hub to a bike frame.

It will be appreciated that a combination of those axle configurations, mechanisms to limit the inward movement of each annular bearing assembly 18, 20, and means for securing the bike hub to a frame illustrated in the embodiments of FIGS. 2, 4 and 5 may be used to practice the teachings of this invention.

Figure 6:
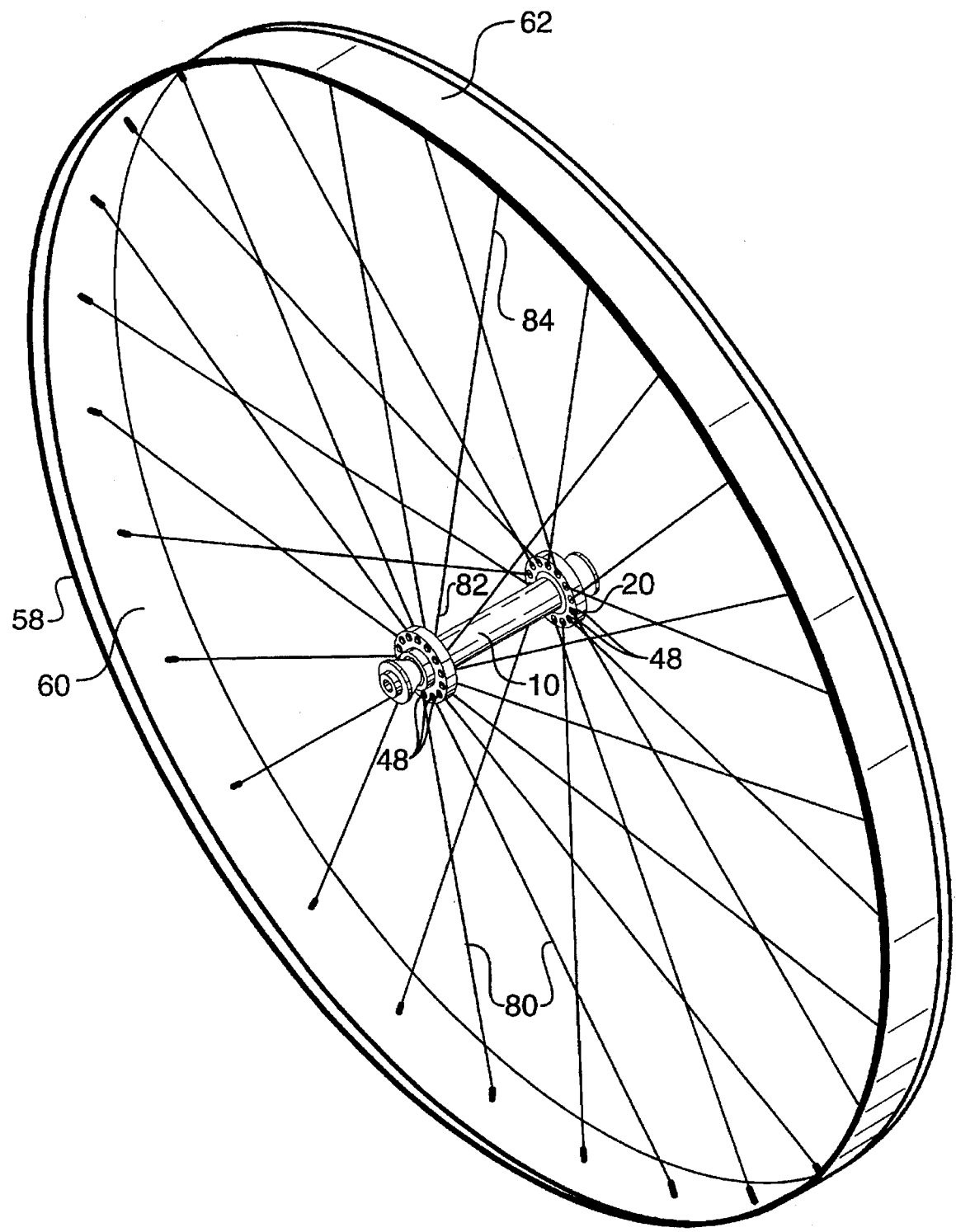
FIG. 6 is a perspective view of a wheel hub embodiment as connected to a wheel rim.

FIG. 6 shows a wheel with the wheel hub 10 attached to a wheel rim 58 using the preferred spoke attachment means. The wheel rim 58 has an inner surface 60 and an outer surface 62. The means for attaching the wheel hub 10 to the wheel rim 58 comprises spokes 80. Each spoke 80 has a first end 82 and a second end 84. The first end 82 of each spoke 80 is positioned within one of the holes 48 disposed within the flanges 46 of each abutment bracket 22, 24. The second end 84 of each spoke 80 is attached to the inner surface 60 of the wheel rim 58.

It will be appreciated that a variety of methods may be utilized to attach the wheel hub 10 to the wheel rim 58, including but not limited to, using solid discs and other known mechanisms; however, the use of spokes 80 is preferred.

Figure 7:
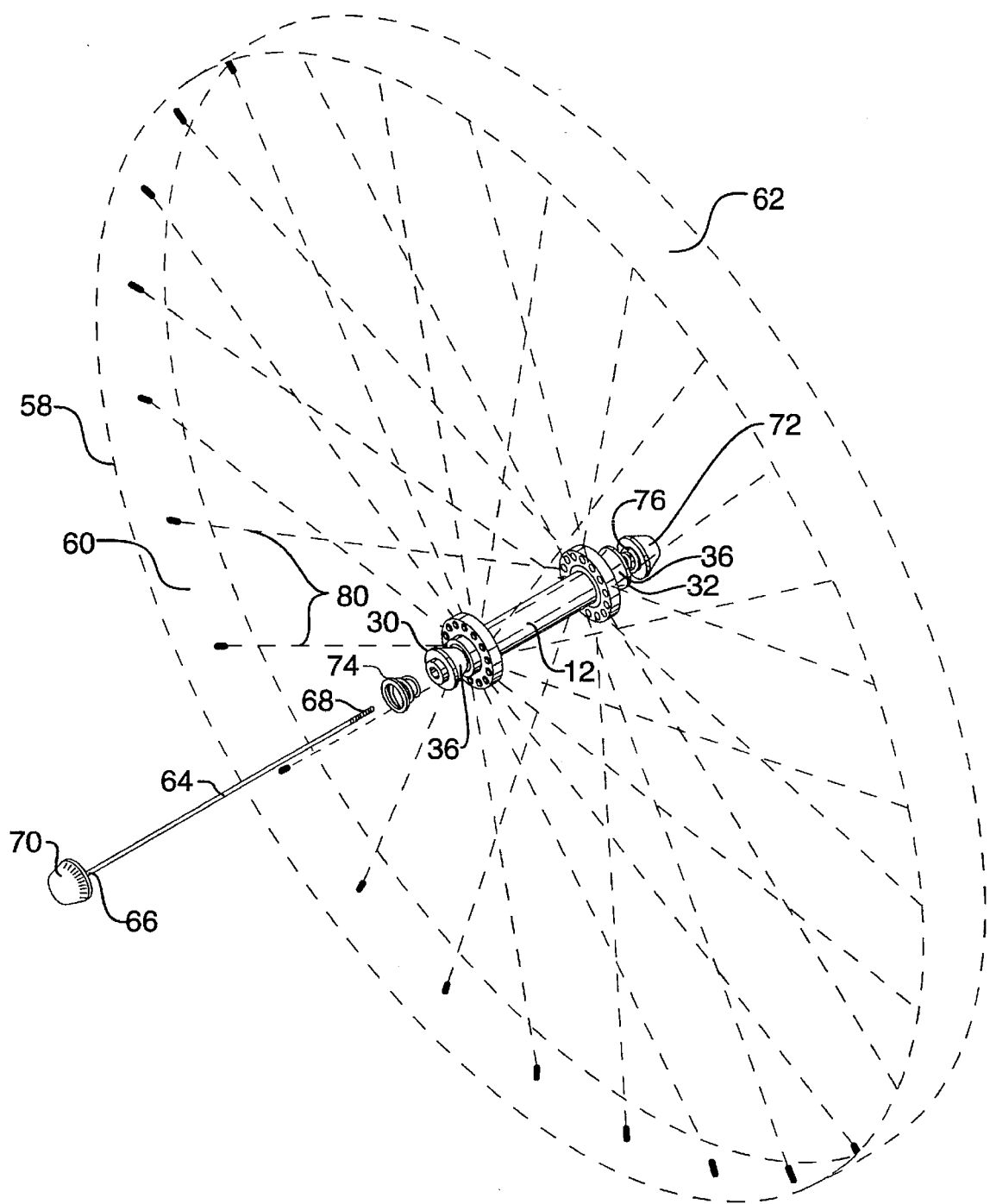
FIG. 7 is a perspective view of a wheel hub embodiment with a skewer shown in exploded view to illustrate one preferred means for attaching the wheel assembly of FIG. 1 to a bicycle frame.

With reference now to FIG. 7, means for securing the wheel hub 10 to a bicycle frame is shown. In the embodiment of FIG. 7 a skewer 64 having a first end 66 and a second end 68 is used. The first end 66 of the skewer 64 is affixed to a first cap 70. The second end 68 of the skewer 64 is threaded to receive a threaded cap 72. The skewer 64 is disposed within the axle 12 of the wheel hub 10 such that the threaded cap 72 can be tightened onto the second end 68 of the skewer 64. Thus, a bicycle frame (for example, the front wheel fork (not shown)) can be clamped between the first cap 70 and the wedge end 36 of the first stop 30 and between the threaded cap 72 and the wedge end 36 of the second stop 32. This is accomplished by threading the second end 68 of the skewer 64 into one end 14, 16 of the axle 12 of the wheel hub 10 until the second end 68 appears out of the other end 14, 16 of the axle 12. A bike frame may then be positioned adjacent the wedge end 36 of each stop 30, 32. The threaded cap 72 is then secured to the second end 68 of the skewer 64. At the threaded cap 72 is tightened onto the skewer 64, the first cap 70 and the threaded cap 72 are drawn toward each other clamping the wheel hub 10 to the bike frame. Springs 74, 76 are provided to assist in centering the skewer within the axle 12 and to bias the attachment to the bicycle frame.

It will be appreciated that there are a variety of ways to attach the wheel hub 10 to a bicycle frame. One way is to configure the wedge end 36 of each stop 30, 32 with a threaded bolt such that the bike frame could be clamped between the wedge end 36 of each stop 30, 32 and a corresponding nut. Another way to attach the wheel hub 10 to a bicycle frame is by using conventional "quick releases" positioned over an extending bolt.

It should be appreciated that the wheel hub of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A wheel hub for attachment to a wheel rim comprising:
    a first and second annular bearing assembly each having an inner annular part and an outer annular part, the inner annular part being capable of independent rotation with respect to the outer annular part, each inner annular part having an inner circumferential surface, and each outer annular part having an outer circumferential surface, and wherein each inner and outer annular part has an inner side surface and an outer side surface;
    means for maintaining the annular bearing assemblies in a spaced relationship, said means being in contact with the inner side surface of each inner annular part, such that the outer annular part of the first bearing assembly is capable of independent rotation with respect to the outer annular part of the second bearing assembly;
    a first and second annular abutment bracket, each one of the annular abutment brackets disposed about the outer circumferential surface of a respective annular bearing assembly, each one of the annular abutment brackets having a lip extending adjacent to the outer side surface of a respective annular bearing assembly for limiting the movement of each annular abutment bracket toward each other with respect to the annular bearing assembly; and
    means to facilitate attachment of the wheel hub to a frame.

2. A cycle hub device as described in claim 1, wherein the means for maintaining the annular bearing assemblies in a spaced relationship comprises an axle having a first end and a second end, at least a portion of the axle positioned between the first and second annular bearing assemblies.

3. A cycle hub device as described in claim 2, wherein at least a portion of each end of the axle is hollow.

4. A cycle hub device as described in claim 2, wherein the axle has a first and second end, the first end of the axle engaging the inner side surface of the inner annular part of the first annular bearing assembly in end-to-side abutment, the second end of the axle engaging the inner side surface of the inner annular part of the second annular bearing assembly in end-to-side abutment.

5. A cycle hub device as described in claim 2, wherein the means for maintaining the annular bearing assemblies in a spaced relationship comprises an axle having at least one raised section, each section having a first and second side surface, each annular bearing assembly positioned over the axle such that the first side surface of the at least one raised section engages the inner side surface of the first annular bearing assembly and such that the second side surface of the at least one raised portion of the axle engages the inner side surface of the second annular bearing assembly thereby preventing the inward movement of each annular bearing assembly along the axle.

6. A cycle hub device as described in claim 5, wherein the diameter of the axle positioned within each annular bearing assembly is substantially the same as the diameter of each annular bearing assembly thereby aligning each annular bearing assembly with the axle.

7. A cycle hub device as described in claim 6, wherein a pair of annular locking pieces are releasable secured to the axle, the first annular locking piece abutting the outer side surface of the inner annular part of the first annular bearing assembly and the second annular locking piece abutting the outer side surface of the inner annular part of the second annular bearing assembly such that each annular bearing assembly is captured between an annular locking piece and a side surface of a raised section of the axle.

8. A cycle hub device as described in claim 2, wherein the means for maintaining the annular bearing assemblies in a spaced relationship comprises an axle having a first annular member and a second annular member, the first annular member disposed about the axle such that when the first annular bearing assembly is positioned over the axle, the first annular member engages the inner side surface of the inner annular part of the first annular bearing assembly and such that when the second annular bearing assembly is positioned over the axle, the second annular member engages the inner side surface of the inner annular part of the second annular bearing assembly, thereby preventing the inward movement of each annular bearing assembly along the axle.

9. A cycle hub device as described in claim 8, wherein the first and second annular member is permanently affixed to the axle.

10. A cycle hub device as described in claim 8, wherein the first and second annular member is releasable secured to the axle.

11. A cycle hub device as described in claim 8, wherein a pair of annular locking pieces are releasable secured to the axle, the first annular locking piece abutting the outer side surface of the inner annular part of the first annular bearing assembly and the second annular locking piece abutting the outer side surface of the inner annular part of the second annular bearing assembly such that each annular bearing assembly is captured between an annular locking piece and an annular member.

12. A wheel hub as described in claim 1, wherein the annular abutment bracket comprises a flange extending away from the axle to facilitate attachment to a rim.

13. A wheel hub as described in claim 11, wherein the flange has a plurality of holes configured to receive spokes which are capable of attachment to a rim.

14. A wheel hub as described in claim 3, wherein the means for facilitating attachment of the wheel hub to a frame comprises a first stop and a second stop, each stop having an axle end and a wedge end, the axle end configured to fit through one of the annular bearing assemblies and within one of the hollow ends of the axle such that the wedge end of the first stop engages the outer side surface of the first annular bearing assembly and the wedge end of the second stop engages the outer side surface of the second annular bearing assembly, thereby capturing each annular bearing assembly between one of the wedge ends and the axle and aligning each annular bearing assembly with the axle.

15. A cycle hub device as described in claim 3, wherein the means for facilitating attachment of the wheel hub to a frame comprises a first and second plug, each plug positioned within a respective hollow end of the axle, the plug having an end extending beyond the axle, said end threaded to received a nut.

16. A cycle hub device as described in claim 2, wherein the means for facilitating attachment of the wheel hub to a frame comprises the first and second end of the axle, each end of the axle being threaded end to receive a nut.

17. A wheel hub comprising:

a first and second annular bearing assembly each having an inner annular part and an outer annular part, the inner annular part being capable of independent rotation with respect to the outer annular part, each inner annular part having an inner circumferential surface, and each outer annular part having an outer circumferential surface, and wherein each inner and outer annular part has an inner side surface and an outer side surface;

means for maintaining the annular bearing assemblies in a spaced relationship comprising an axle having a first and second end, at least a portion of each end being hollow, the first end of the axle engaging the inner side surface of the inner annular part of the first annular bearing assembly in end-to-side abutment, the second end of the axle engaging the inner side surface of the inner annular part of the second annular bearing assembly in end-to-side abutment such that the outer annular part of the first bearing assembly is capable of independent rotation with respect to the outer annular part of the second bearing assembly;

a first and second annular abutment bracket, each one of the annular abutment brackets disposed about the outer circumferential surface of a respective annular bearing assembly, each one of the annular abutment brackets having a lip extending adjacent to the outer side surface of a respective annular bearing assembly for limiting the movement of each annular abutment bracket toward each other with respect to the annular bearing assembly, each annular abutment bracket comprising a flange extending away from the axle to facilitate attachment to a rim, each flange having a plurality of holes configured to receive spokes which are capable of attachment to a rim; and means for facilitating attachment to a frame comprising a first stop and a second stop, each stop having an axle end and a wedge end, the axle end configured to fit through one of the annular bearing assemblies and within one of the hollow ends of the axle such that the wedge end of the first stop engages the outer side surface of the first annular bearing assembly and the wedge end of the second stop engages the outer side surface of the second annular bearing assembly, thereby capturing each annular bearing assembly between one of the wedge ends and the axle and aligning each annular bearing assembly with the axle.

18. A wheel hub as described in claim 17, wherein the attachment of the axle and bearing assembly to the rim creates an inward force on the annular abutment bracket and the annular bearing assembly.

19. A wheel hub device as described in claim 17, wherein the inner diameter of each annular bearing assembly is substantially equal to the inner diameter of each hollow end of the axle.

20. A wheel hub as described in claim 19, wherein the axle end of the first stop is configured to maintain the inner diameter of the first annular bearing assembly and the inner diameter of the first end of the axle in substantial alignment and the axle end of the second stop is configured to maintain the inner diameter of the second annular bearing assembly and the inner diameter of the second end of the axle is substantial alignment, thereby limiting the lateral movement of each of the annular bearing assemblies with respect to the axle.

21. A wheel hub as described in claim 17, wherein the outer diameter of the axle is less than 30 millimeters.

22. A wheel hub as described in claim 17, wherein the wheel hub weighs less than 100 grams.

23. A bicycle wheel for attachment to a bicycle frame comprising:

a rim; and a wheel hub comprising:

a first and second annular bearing assembly each having an inner annular part and an outer annular part, the inner annular part being capable of independent rotation with respect to the outer annular part, each inner annular part having an inner circumferential surface, and each outer annular part having an outer circumferential surface, and wherein each inner and outer annular part has an inner side surface and an outer side surface;

means for maintaining the annular bearing assemblies in a spaced relationship comprising an axle having a first and second end, at least a portion of each end being hollow, the first end of the axle engaging the inner side surface of the inner annular part of the first annular bearing assembly in end-to-side abutment, the second end of the axle engaging the inner side surface of the inner annular part of the second annular bearing assembly in end-to-side abutment such that the outer annular part of the first bearing assembly is capable of independent rotation with respect to the outer annular part of the second bearing assembly;

a first and second annular abutment bracket, each one of the annular abutment brackets disposed about the outer circumferential surface of a respective annular bearing assembly, each one of the annular abutment brackets having a lip extending adjacent to the outer side surface of a respective annular bearing assembly for limiting the movement of each annular abutment bracket toward each other with respect to the annular bearing assembly, each annular abutment bracket comprising a flange extending away from the axle to facilitate attachment to a rim, each flange having a plurality of holes configured to receive spokes which are capable of attachment to a rim; and means for facilitating attachment to a frame comprising a first stop and a second stop, each stop having an axle end and a wedge end, the axle end configured to fit through one of the annular bearing assemblies and within one of the hollow ends of the axle such that the wedge end of the first stop engages the outer side surface of the first annular bearing assembly and the wedge end of the second stop engages the outer side surface of the second annular bearing assembly, thereby aligning and capturing each annular bearing assembly between one of the wedge ends and the axle; and means for attaching the wheel hub to a rim.

24. A bicycle wheel as described in claim 23, wherein the means for attaching the wheel hub to the rim comprises a plurality of spokes, each spoke having a first end and a second end, the first end of each spoke configured for positioning within the holes disposed within the flange of the abutment bracket, the second end of each spoke attached to the rim.

25. A bicycle wheel as described in claim 23, wherein the means for securing the axle and bearing assembly to the bicycle frame further comprises a skewer having a first end and a second end, the first end of the skewer having a cap secured thereto, the second end of the skewer being threaded to receive a threaded cap, the skewer being disposed within the axle such that the threaded cap can be tightened onto the second end of the skewer, thereby enabling the clamping of the bicycle frame between the first cap and the wedge end of the first stop and between the threaded cap and the wedge end of the second stop.

26. A bicycle wheel as described in claim 23, wherein the diameter of the axle is less than 30 millimeters.

* * * * *